United States Patent [19]

Landingham et al.

[11] 4,293,619

[45] Oct. 6, 1981

[54] SILICON-NITRIDE AND METAL COMPOSITE

[75] Inventors: Richard L. Landingham, Livermore, Calif.; Sarah A. Huffsmith, Urbana, Ill.

[73] Assignee: The United States of America as represented by the United States Department of Energy, Washington, D.C.

[21] Appl. No.: 47,597

[22] Filed: Jun. 11, 1979

[51] Int. Cl.³ ............................................. B32B 15/04
[52] U.S. Cl. ................................. 428/623; 75/208 R; 416/241 B; 428/552; 428/553; 428/627; 428/661; 428/663
[58] Field of Search ............... 428/627, 641, 661–666, 428/623, 628, 552, 553; 148/31.5; 29/420, 420.5; 416/241 B, 176 R; 228/263 A, 252, 248; 75/208 R

[56] References Cited

U.S. PATENT DOCUMENTS

| | | | |
|---|---|---|---|
| 2,690,409 | 9/1954 | Wainer | 428/663 |
| 2,878,554 | 3/1959 | Long | 428/553 |
| 3,139,671 | 7/1964 | Herron et al. | 228/263 A |
| 3,383,235 | 5/1968 | Blackburn et al. | 428/641 |
| 3,432,280 | 3/1969 | Llewelyn et al. | 428/641 |
| 3,573,996 | 4/1971 | Wimber et al. | 148/31.5 |

FOREIGN PATENT DOCUMENTS

| | | | |
|---|---|---|---|
| 533731 | 11/1956 | Canada | 428/641 |
| 2456435 | 8/1976 | Fed. Rep. of Germany | 428/552 |

OTHER PUBLICATIONS

Huffsmith, S. A., et al.; "Pressure Bonding Mo Alloy TZM to Reaction Bonded Silicon Nitride" Lawrence Livermore Laboratory UCID-17805 pp. 1–18 (8/7/78).
"1978 Databook"; *Metal Progress* Mid Jun., 1978, p. 122.

*Primary Examiner*—Michael L. Lewis
*Attorney, Agent, or Firm*—William S. Bernheim; Roger S. Gaither; James E. Denny

[57] ABSTRACT

A composite and a method for bonding the composite. The composite includes a ceramic portion of silicon nitride, a refractory metal portion and a layer of $MoSi_2$ indirectly bonding the composite together. The method includes contacting the layer of $MoSi_2$ with a surface of the silicon nitride and with a surface of the metal; heating the layer to a temperature below 1400° C.; and, simultaneously with the heating, compressing the layer such that the contacting is with a pressure of at least 30 MPa. This composite overcomes useful life problems in the fabrication of parts for a helical expander for use in power generation.

6 Claims, No Drawings

SILICON-NITRIDE AND METAL COMPOSITE

BACKGROUND OF THE INVENTION

1. Field of the Invention

The invention described herein relates to a laminated composite of a ceramic and a refractory metal and, more particularly, to a composite which can be fabricated to form parts for a helical expander for the energy generation industry. The ceramic includes silicon nitride.

2. Description of the Prior Art

Efforts have been made to construct a helical expander to recover heat energy by directly expanding combustion gases in coal-burning power plants. It is expected that, if a suitable expander were available, the typical generating efficiency of these plants could be increased from 34–40% to 50–60%.

These efforts have failed because the materials considered for constructing the expander could not survive the environment for a sufficient period of time to be practical. The gases from the combustion are typically at a temperature on the order of 1000° C. and at a pressure on the order of 240 MPa (megapascals.). Further, the stream includes corrosives, such as hydrogen sulfide and sulfuric acid.

Helical expanders having a ceramic rotor mounted on a metal shaft have been considered. The ceramic would provide protection against heat and corrosives and the metal would provide strength. A suitable match of a ceramic and metal was not been found. In particular, a bond of sufficient strength to secure the ceramic rotor to the metal shaft is a problem. For instance, the coefficient of thermal expansion for the ceramic and for the metal must be quite similar for the bond between the ceramic rotor and metal shaft to survive thermal cycling.

Silicon nitride ($Si_3N_4$), a ceramic which has been employed in stator blades of high-temperature gas turbines, has been suggested as the ceramic from which to fabricate parts for the helical expander. Characteristics which were considered in suggesting silicon nitride include thermal shock resistance, oxidation resistance, thermal creep resistance, environment, and fabrication. However, suitable bonding of silicon nitride to a metal, in terms of strength, has been achieved in the past only at temperatures above 1400° C. and pressures above 137 MPa. This bonding appears to depend on partial melting or diffusion of the metal into the silicon nitride which is porous and these temperatures and pressures have adversely affected the characteristics of the silicon nitride and/or metal in most cases.

STATEMENT OF THE OBJECTS

Accordingly, an object of this invention is to provide a method for forming a composite including silicon nitride and metal such that the composite can withstand high temperature and high pressure.

Another object is a composite from which parts suitable for a helical expander to be used with the topping cycle of a power plant can be fabricated.

Other objects, advantages and novel features of the invention will become apparent to those skilled in the art upon examination of the following detailed description of the invention.

SUMMARY OF THE INVENTION

A novel laminated composite and a novel method for bonding the composite are described. The composite includes a ceramic portion of silicon nitride; a refractory metal portion selected from Mo, W, Ta or their associated alloys; and a layer of $MoSi_2$ between and bonded to the ceramic portion and to the metal portion. The composite is useful in the fabrication of parts for a helical expander.

The method includes contacting, as a bonding agent, a layer of $MoSi_2$ with a surface of the ceramic portion and with a surface of the refractory metal; heating the layer; and, simultaneously with the heating, compressing the layer such that the contacting is with a pressure of at least 30 MPa. The resulting bonds within the composite can withstand temperatures of 1000° C. and mechanical stresses up to 240 MPa.

DETAILED DESCRIPTION

In a preferred embodiment, a helical expander includes a rotor fabricated from silicon nitride and a shaft fabricated from a refractory metal composed of Mo, Ti, and Zr. The rotor is bonded to the shaft by a layer of $MoSi_2$. In particular, the composition of the refractory metal is preferably about 0.5% by weight Ti, about 0.08% weight Zr, and the remainder molybdenum.

To form suitable bonds, a layer of $MoSi_2$ is reacted in part to form an indirect bond between the silicon nitride and the metal; each of which (the silicon nitride and the metal) is bonded to an unreacted $MoSi_2$ sublayer by a reacted $MoSi_2$ sublayer. In other words, after reaction the $MoSi_2$ layer includes three sublayers, an unreacted sublayer sandwiched between a sublayer reacted with the silicon nitride and a sublayer reacted with the metal. Each reacted sublayer is preferably on the order of 10 microns in thickness. The unreacted $MoSi_2$ layer should be greater than 0.1 mm and preferably between about 0.2 and 0.3 mm thick to avoid failure of the bond during thermal cycling due to the difference in thermal expansion of the metal and of the silicon nitride.

The preferred method of forming and reacting a $MoSi_2$ layer consists of applying, to a smooth surface of the selected metal or of the ceramic, a uniform layer of $MoSi_2$ particles in a particle-size range of less than about 20 microns. The small particle size of the $MoSi_2$ facilitates penetration of the porous silicon-nitride and, consequently, produces a stronger bond. The layer can be applied as a slurry of the $MoSi_2$ particles in acetone.

The $MoSi_2$ layer is then sandwiched by positioning the layer between the above surface and the other of a surface of the ceramic or of the selected metal. Preferably, the surface of the metal is treated with an acid to remove organic films and excessive oxide layers from the surface prior to contacting the $MoSi_2$ layer.

Alternatively, a pre-formed wafer of $MoSi_2$ can be used for the layer; but, the surfaces of the wafer to be contacted with the silicon-nitride or metal need to be coated with $MoSi_2$ particles of about 20 microns for best results.

The bond is created by heating and simultaneously compressing the $MoSi_2$ layer where it is in contact with the surfaces of the ceramic and the selected metal. The $MoSi_2$ layer is heated to a temperature of from about 1000° C. to about 1300° C. At lower temperatures the bond strengthens at a slower rate or not at all. The preferred temperature is about 1300° C. The bonding should not be carried out above about 1300° C. to avoid recrystallization and a corresponding loss of strength in the metal.

Simultaneous with the heat, compression is applied to the bonding surfaces. Pressures of from about 60 to about 80 MPa are suitable. Higher pressures are unnecessary and can adversely affect the characteristics of the composite. Lower pressures result in a weaker bond within the same time frame. The preferred pressure is about 69 MPa. The maximum bond strength occurs in from 1 to 4 hours.

An advantage of this bond is that it can be formed at a temperature and pressure which do not adversely affect the hardness and grain structure of the metal or of the silicon nitride.

The foregoing description of the invention has been presented for purposes of illustration and description and is not intended to be exhaustive or to limit the invention to the precise form disclosed. It was chosen and described in order to best explain the principles of the invention and their practical application to enable others skilled in the art to best utilize the invention in various embodiments and with various modifications as are suited to the particular use contemplated. It is intended that the scope of the invention be defined by the claims.

We claim:

1. A composite formed in part from a ceramic substrate of silicon nitride and from a refractory metal substrate, said composite comprising:
   (i) the ceramic substrate of silicon nitride;
   (ii) the refractory metal substrate which comprises Mo, Ti and Zr; and
   (iii) a layer greater than 0.1 mm in thickness consisting essentially of $MoSi_2$ between the ceramic substrate and refractory metal substrate,
      said layer bonded to the ceramic substrate by a first reacted sublayer on the order of 0.01 mm in thickness and bonded to the metal substrate by a second reacted sublayer on the order of 0.01 mm in thickness;
   whereby the composite will remain intact as a composite during thermal cycling up to pressures of 240 MPa and temperatures of 1000° C.

2. The composite according to claim 1 wherein said metal portion comprises about 0.5% by weight Ti and about 0.08% by weight Zr.

3. The composite of claim 1 wherein the layer of $MoSi_2$ is formed from a substrate consisting essentially of $MoSi_2$.

4. A composite comprising:
   a ceramic substrate of silicon nitride;
   a refractory metal substrate selected from Mo, W, Ta and their associated alloys; and
   a layer greater than 0.1 mm in thickness consisting essentially of $MoSi_2$ between the ceramic substrate and refractory metal substrate;
   with said layer bonded to the ceramic substrate by a first reacted sublayer on the order of 0.01 mm in thickness and bonded to the metal substrate by a second reacted sublayer on the order of 0.01 mm in thickness, wherein said composite is prepared by:
   (a) contacting as a bonding agent, the layer of $MoSi_2$ with a portion of the silicon nitride substrate and with a portion of the refractory metal substrate;
   (b) heating the layer of $MoSi_2$ to a temperature of between about 1000° C. to about 1300° C.; and
   (c) compressing the layer with said portions of said substrates, simultaneously with said heating, such that said compression of the layer is with a pressure of at least 30 MPa.

5. The composite according to claim 4 wherein said unreacted $MoSi_2$ sublayer is between about 0.2 mm and 0.3 mm in thickness.

6. The composite of claim 4 wherein the composite will remain intact as a composite during thermal cycling up to pressures of 240 MPa and temperatures of 1000° C.

* * * * *